F. W. WAKEFIELD.
CHAIN.
APPLICATION FILED OCT. 12, 1908. RENEWED AUG. 19, 1909.
937,663.
Patented Oct. 19, 1909.
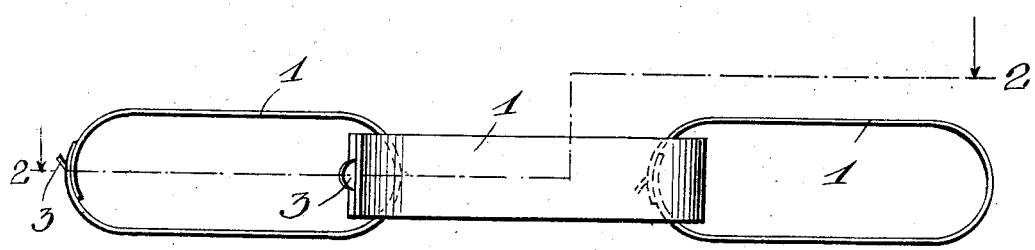
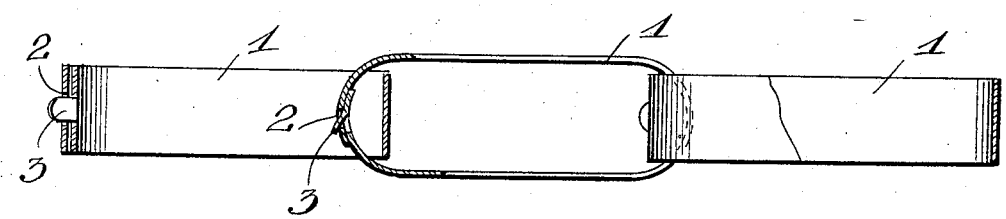
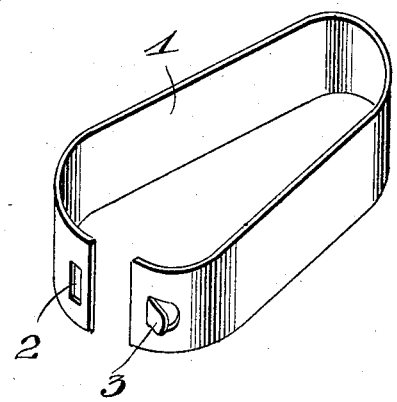
Witnesses
Inventor
F. W. Wakefield
Attorneys

UNITED STATES PATENT OFFICE.

FREDERICK W. WAKEFIELD, OF VERMILION, OHIO.

CHAIN.

937,663.   Specification of Letters Patent.   Patented Oct. 19, 1909.

Application filed October 12, 1908, Serial No. 457,387. Renewed August 19, 1909. Serial No. 513,690.

*To all whom it may concern:*

Be it known that I, FREDERICK W. WAKEFIELD, a citizen of the United States, residing at Vermilion, in the county of Erie and State of Ohio, have invented certain new and useful Improvements in Chains; and I do declare the following to be a full, clear, and exact description of the invention, such as will enable others skilled in the art to which it appertains to make and use the same.

This invention relates to improvements in chains and has for its object the production of a detachable link chain so constructed that the links may be readily connected together or disconnected when they are connected without mutilation or injury to the links.

Another object of the invention is the production of a detachable link chain so constructed that when a strain or weight is placed upon the chain, the links will be securely held in connection by the effect of said weight or strain upon the connecting link portions.

With these and other objects in view, the invention consists of certain novel features of construction, combination and arrangement of parts as will be more fully described and particularly pointed out in the appended claim.

In the accompanying drawings, Figure 1 is a side elevation of my improved detachable link chain; Fig. 2 is a sectional view taken on line 2—2 of Fig. 1; and Fig. 3 is a perspective view of a detached link showing the ends thereof open.

In the drawings, I have illustrated a type of chain particularly adapted for ornamental work such as chain railings or chain decorations for buildings or for supporting light fixtures and similar devices.

Numeral 1 designates a link which is preferably formed of spring metal. One of the ends of the link 1 is formed with a slot 2 and the opposite end is formed with an outwardly facing angularly disposed tongue 3 which is adapted to extend through the slot 2. When the tongue 3 is not secured to the slot 2, the ends of the link 1 will be extended apart. When it is desired to connect said ends together, pressure is applied thereto so that the end formed with the slot 2 will pass over the end formed with the tongue 3 and said tongue will snap into said slot. When the respective ends of the link 1 are connected together and pressure is exerted on said link, the slotted end of the link will be forced against the tongue 3 thereby rigidly holding the link ends in positive connection.

My improved detachable link provides a means for the construction of a simple, strong and ornamental chain which may be readily shortened or lengthened to meet particular requirements or conditions and said link is constructed in one piece and eliminates the necessity of molded or brazed joints.

From the foregoing description, taken in connection with the accompanying drawings, the construction and operation of the invention will be readily understood without requiring a more extended explanation.

Various changes in the form, proportions and the minor details of construction, may be resorted to without departing from the principle or sacrificing any of the advantages of the invention as defined in the appended claim.

Having thus described and ascertained the nature of my invention, what I claim as new and desire to secure by Letters-Patent is:

A detachable chain member comprising a link formed substantially oval and having its opposite ends arranged so as to overlap each other and to form one end of the link, one of said ends being formed with a transverse slot and the other end being formed with an outwardly deflected locking tongue adapted to enter the slot of the other end, said link being formed of spring metal and adapted to receive pressure so that the locked ends thereof will be rigidly secured together under the stress of said pressure.

In testimony whereof I have hereunto set my hand in presence of two subscribing witnesses.

FREDERICK W. WAKEFIELD.

Witnesses:
E. L. COIN,
M. E. LAWLESS.